No. 795,664. PATENTED JULY 25, 1905.
H. C. UCKER.
AUTOMOBILE ATTACHMENT.
APPLICATION FILED OCT. 26, 1904.
2 SHEETS—SHEET 2.
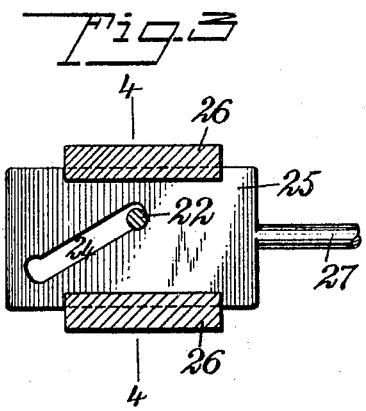
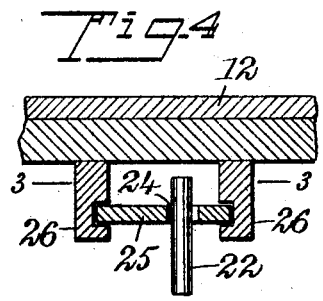
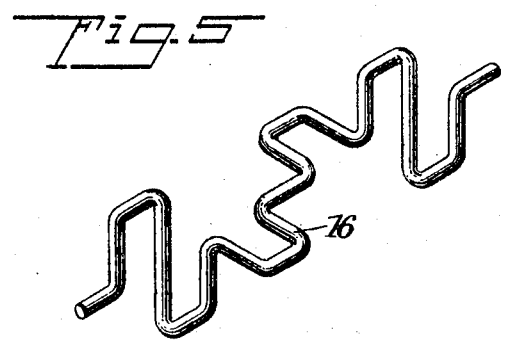
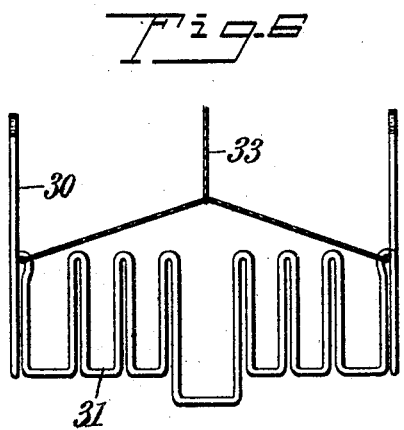
WITNESSES:
J. A. Brophy
Isaac B. Owens.
INVENTOR
Henry C. Ucker
BY
ATTORNEYS

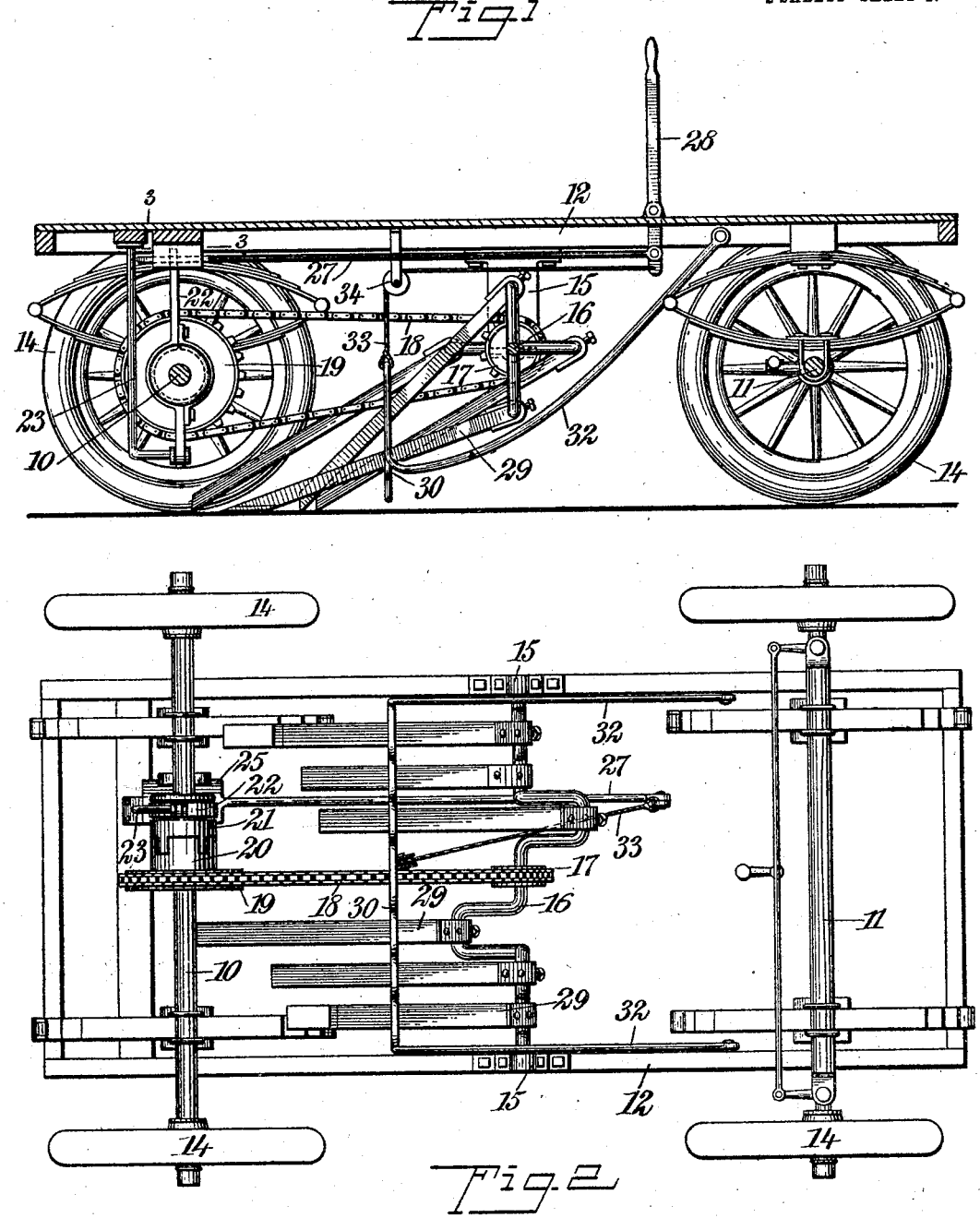

UNITED STATES PATENT OFFICE.

HENRY CHARLES UCKER, OF FAYETTEVILLE, ARKANSAS.

AUTOMOBILE ATTACHMENT.

No. 795,664.　　　Specification of Letters Patent.　　　Patented July 25, 1905.

Application filed October 26, 1904. Serial No. 230,044.

*To all whom it may concern:*

Be it known that I, HENRY CHARLES UCKER, a citizen of the United States, and a resident of Fayetteville, in the county of Washington and State of Arkansas, have invented a new and Improved Automobile Attachment, of which the following is a full, clear, and exact description.

The invention relates to an auxiliary propelling means applied to motor-driven vehicles for carrying passengers or freight and adapted to be thrown into operation when the wheels of the vehicle slip or for other reasons fail to exert their proper propelling effect. The propelling device comprises a series of push-bars and means for mounting and driving them. It also comprises certain novel devices for moving the push-bars in and out of action.

Reference is had to the accompanying drawings, illustrating the preferred embodiment of my invention, in which drawings like characters of reference indicate like parts in the several views, and in which—

Figure 1 is a side elevation of the mechanism with parts of an automobile indicated in section and other parts in elevation. Fig. 2 is a bottom plan view of the running-gear of an automobile with my invention applied thereto. Fig. 3 is a detail section on the line 3 3 of Fig. 4 and illustrating an operating device for the clutch. Fig. 4 is a section of the same parts on the line 4 4 of Fig. 3. Fig. 5 is a perspective view of the crank-shaft, and Fig. 6 is a view showing the device for raising the push-bars out of action.

In Figs. 1 and 2, 10 and 11 indicate the axles, 12 the frame, and 14 the road-wheels, of a motor-vehicle. Mounted in hangers 15, depending from the frame, is a revoluble crank-shaft 16. This shaft is attached to a sprocket-gear 17, over which runs a chain 18. The chain extends rearward to a sprocket-gear 19 loose on the driving-axle 10. This sprocket-gear 19 has a clutch member 20 connected thereto, and coacting with the clutch member 20 is a member 21, splined on the rear or driving axle 10. In connection with said clutch member 21 is a shifting lever 22, the lower end of which is fulcrumed on an arm 23, depending from the frame of the machine. The upper end of said lever, as shown best in Figs. 3 and 4, is set loosely in a diagonal slot 24, formed in a slide-plate 25. This slide-plate is mounted movably in suitable guides 26 and is connected by a rod 27 to a hand-lever 28. By the operation of the slide-plate 25 the lever 22 may be thrown from one position to the other and the clutch members 20 and 21 engaged or disengaged, as desired, so as to start or stop the operation of the crank-shaft 16.

Connected to the crank-shaft 16 are the push-bars 29, which are mounted to swing on the crank-shaft and extend rearward and downward into engagement with the ground, as shown. On the rotation of the crank-shaft the push-bars will act to drive the machine forward, these bars having positive engagement with the ground and acting on surfaces on which the traction-wheels of the motor-vehicle would not effectively act. The shaft 16 has its cranks quartered, as shown in Figs. 1 and 5, so as to cause the push-bars to operate in rapid succession. For raising the push-bars out of action when desired I provide a sling 30, having a number of seats 31, respectively receiving the push-bars. The sling is mounted to swing on the frame of the automobile by means of arms 32, attached to the sling and pivoted on the frame, and for raising the sling I provide a flexible connection 33, attached to the sling, running over a guide-sheave 34 and attached at the other end to the lever 28, before described. In this manner the push-bars may be raised out of action, and by a proper adjustment of the parts at the same time that the lever 28 is operated to raise the push-bars the slide 25 will be operated to disengage the clutch members. Upon reversing the movement of the lever 28 a reversal of the above-described operation necessarily takes place.

Various changes in the form, proportions, and minor details of my invention may be resorted to at will without departing from the spirit and scope thereof. Hence I consider myself entitled to all such variations as may lie within the terms of my claims.

Having thus described the preferred form of my invention, what I claim as new, and desire to secure by Letters Patent, is—

1. The combination with a wheeled vehicle, of push-bars, means for mounting and operating the same, a controller for the operating means, a hand-operated member with which said controller is connected, means for raising the push-bars out of action, and a connection between the last-named means and the said hand-operated member.

2. The combination with a wheeled vehicle, of a series of push-bars, means for mounting and operating the same, a controller for the operating means, means for lifting the push-bars out of action, and means for simultaneously operating the controller and said lifting means.

3. The combination with a motor-vehicle, of a series of push-bars, means for mounting and operating the same, said means including a clutch, a member in connection with the clutch to operate it, a slide having a cam-surface engaged with said member, and means for operating the slide.

4. The combination with a motor-vehicle, of a series of push-bars, a crank-shaft to which said push-bars are connected, a driving connection between said crank-shaft and the driving-axle of the vehicle, said driving connection including coacting clutch members, a sling located under the push-bars to raise them, means for mounting the sling on the motor-vehicle, means for raising the sling, the said means including a hand-lever, and mechanism for engaging and disengaging the clutch members and connected with said hand-lever.

5. The combination with a motor-vehicle, of a series of push-bars, means for mounting and operating the same, and a sling located under the push-bars to raise them, the sling being provided with seats to receive the push-bars, means for mounting the sling comprising arms connected to the sling and hinged to the vehicle-frame, a flexible connection attached to the sling and passing over a guide-sheave, and a lever to which the flexible connection is secured.

6. The combination with a motor-vehicle, of a series of push-bars, a crank-shaft to which said push-bars are connected, a sprocket-gear on said crank-shaft connected by a chain with a sprocket-gear loose on the driving-axle of the vehicle, a clutch member connected with the sprocket-gear on the driving-axle, a coacting clutch member on said axle, a slide-plate having a diagonal slot formed therein, a shifting lever connected with the clutch member on the axle, the said lever being fulcrumed at one end and engaging with its other end the slot in said slide-plate, and a lever connected by a rod with said slide-plate.

7. The combination with a motor-vehicle, of a series of push-bars, a crank-shaft to which said push-bars are connected, a driving connection between said crank-shaft and the driving-axle of the vehicle and including coacting clutch members, a shifting lever connected with one of said clutch members, a slide having a diagonal slot engaged by said shifting lever, and means for operating the slide.

In testimony whereof I have signed my name to this specification in the presence of two subscribing witnesses.

HENRY CHARLES UCKER.

Witnesses:
T. R. PUTMAN,
R. H. JOHNSON.